(No Model.)

H. A. HUGHES.
APPARATUS FOR REMOVING END SECTIONS FROM STALKS.

No. 402,081. Patented Apr. 23, 1889.

WITNESSES:
Gustave Dieterich
Edgar Goodwin

INVENTOR,
Henry A. Hughes
BY
his ATTORNEY.

UNITED STATES PATENT OFFICE.

HENRY A. HUGHES, OF RIO GRANDE, NEW JERSEY.

APPARATUS FOR REMOVING END SECTIONS FROM STALKS.

SPECIFICATION forming part of Letters Patent No. 402,081, dated April 23, 1889.

Application filed December 27, 1887. Serial No. 258,962. (No model.)

*To all whom it may concern:*

Be it known that I, HENRY A. HUGHES, of Rio Grande, Cape May county, New Jersey, have invented a new and useful Improvement in Apparatus for Removing and Separating End Sections from Stalks, of which the following is a specification.

In preparing sorghum-cane for sugar extraction by diffusion it is necessary to divide the stalk into short lengths, and also to separate therefrom the leaves and sheaths and heads. The leaves and sheaths are easily removable by the process of cutting already patented to me on December 28, 1886, in Letters Patent No. 254,905, and in another application for Letters Patent simultaneously filed herewith, Serial No. 258,965, I have fully described and claimed my apparatus for cutting the stalks.

My present invention relates to the removal of the end sections containing the heads or seed bodies or broom from the stalks. This is necessary in order to separate out the seed and to prevent the same from becoming mixed with the cane as prepared for diffusion. Hitherto it has been the custom to cut off the heads by a guillotine or other knife, under which the stalks were adjusted by hand, so that to the head only the minimum of utilizable stalk should remain attached. This takes considerable time and labor and materially increases the cost of preparing the cane.

By my invention the removal of the heads and their separation from the cut stalks are rendered entirely automatic. The cane is fed to the cutting device without prior removal of the heads, and the heads after removal cannot pass into the receptacle for the cut cane.

Figure 1:
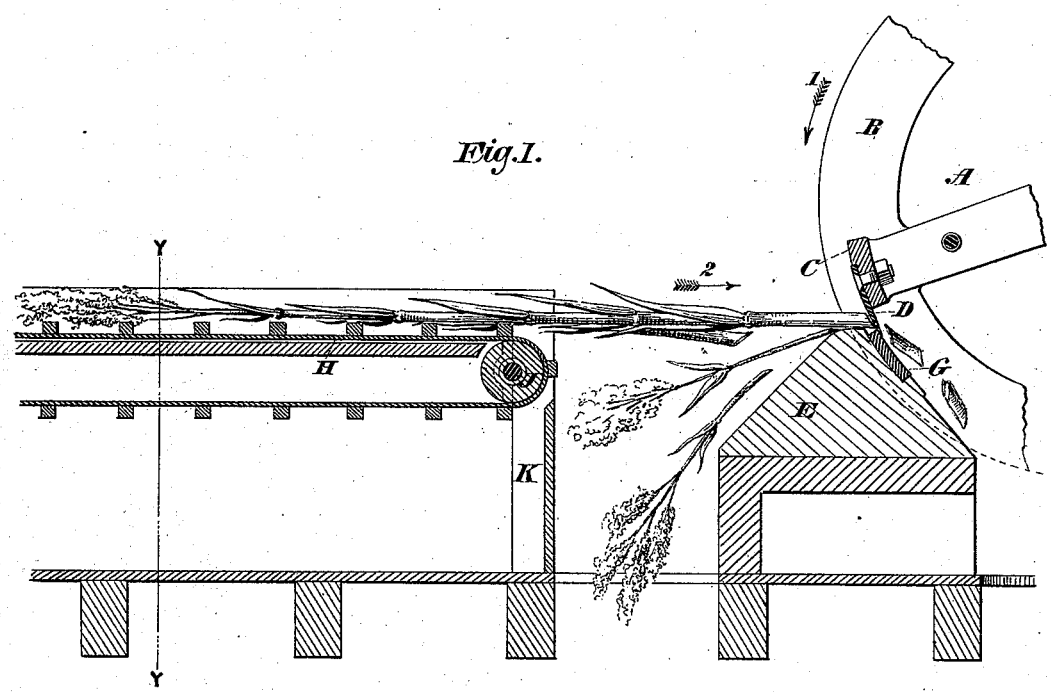
Figure 2:
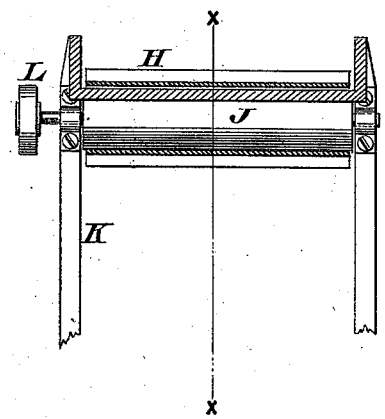

In the accompanying drawings, Figure 1 is a vertical section of my apparatus on the line *x x* of Fig. 2. Fig. 2 is a transverse section on the line Y Y of Fig. 1.

Similar letters of reference indicate like parts.

At A is the apparatus for cutting the stalks. I do not limit myself to any special device for this purpose, so that any guillotine or similar moving knife between which and a suitable block the cane is fed may be used. The mechanism represented in the drawings is a portion of that set forth in my aforesaid pending application and embodies two rotary disks, B, between which extends a bar, C, on which is a knife, D. The disks D rotate in the direction of the arrow 1.

E is a stationary block or support, provided with a plate, G, disposed tangentially and in close proximity to the path of rotation of the knife D. The cane fed in the direction of arrow 2 between the knife D and plate G is divided by the cutting-edge of knife D and upper edge of plate G.

H is an endless apron, provided with transverse slats I and passing over rollers J, mounted in any suitable frame, K. The apron is caused to travel by revolving the pulley L, Fig. 2, which is on the end of one of the roller-shafts. The cane to be cut is placed on the upper side of the apron H, and is so carried onward to the knife D.

It will now be observed that the stalk is placed upon the apron H with its butt toward the rotating knife and that the stalk has considerable length—say five or six feet. Consequently, as the stalk is fed in beneath the knife, the latter intermittingly descends, thus cutting off successive short lengths. It will also be apparent that during the cutting operation the stalk is supported at two points—namely, by the support E and by the moving apron H. Particular attention is now called to the fact that a space or interval, M, is left between this support and the apron H. As long as any of the stalk rests on the apron that stalk will be fed forward; but the instant the head of the stalk runs off the extremity of the apron, then that end of the stalk is of course no longer supported. Consequently the head drops into space M between apron and cutter, as shown in Fig. 1, and never reaches the cutting-knife. By this simple expedient of a suitable interval left between apron and support E, I insure complete separation of the heads without any care or attention whatever on the part of the person in charge of the machine, and absolutely prevent any possibility of their passing under the cutter or becoming mixed with the chopped stalk. In practice a chute is provided beneath this interval for leading the heads to any convenient place of deposit.

It is of course necessary that the width of the interval M, measured from the edge of the apron H to the support E, should be greater than the length of the seed broom or head, or, generally, than the end section of the stalk which it is desired shall be separated. In treating sorghum-cane I usually make this interval about eighteen inches in width.

Obviously my invention is not limited in its application to the removal of seed-heads from sorghum, although it has been for that purpose especially devised and utilized by me. It is equally applicable to the removal of the broom from corn or for cutting off and separating end sections of any other stalk-like objects.

I claim—

1. An apparatus for removing and separating end sections from stalks, &c., containing the combination of a descending cutting-blade, a traveling carrier adapted to support said stalks and feed them to said cutting-blade, and a fixed support for said stalks in front of and adjacent to said cutting-blade, the said support and proximate end of the stalk-carrier being separated by a free space or interval greater in width than the length of the end sections to be separated, substantially as described.

2. An apparatus for removing and separating end sections from stalks, &c., containing the combination of a rotary descending cutting-blade, a continuously-moving carrier adapted to support said stalks and feed them to said cutting-blade, and a fixed support for said stalks in front of and adjacent to said cutting-blade, the said support and proximate end of the stalk-carrier being separated by a free space or interval greater in width than the length of the end sections to be separated, substantially as described.

3. An apparatus for removing and separating end sections from stalks, &c., containing the combination of a rotary intermittently-descending cutting-blade, the endless traveling apron or carrier H and stationary support E, the said fixed support E and proximate end of apron H being separated by a space or interval greater in width than the length of the end sections to be separated, substantially as described.

HENRY A. HUGHES.

Witnesses:
D. H. DRISCOLL,
EDGAR GOODWIN.